United States Patent
Sahu et al.

(10) Patent No.: US 12,480,037 B2
(45) Date of Patent: Nov. 25, 2025

(54) MATERIAL AND METHOD FOR FLOW DIVERSION IN PROPPANT FRACTURING

(71) Applicant: Saudi Arabian Oil Company, Dhahran (SA)

(72) Inventors: Qasim Sahu, Thuwal (SA); Mohammed I. Alabdrabalnabi, Al Qatif (SA); Rajendra Arunkumar Kalgaonkar, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 18/644,325

(22) Filed: Apr. 24, 2024

(65) Prior Publication Data

US 2025/0333639 A1    Oct. 30, 2025

(51) Int. Cl.
*C09K 8/80* (2006.01)
*E21B 36/00* (2006.01)
*E21B 43/267* (2006.01)

(52) U.S. Cl.
CPC .............. *C09K 8/805* (2013.01); *E21B 36/00* (2013.01); *E21B 43/267* (2013.01)

(58) Field of Classification Search
None
See application file for complete search history.

(56) References Cited

U.S. PATENT DOCUMENTS

| | | | |
|---|---|---|---|
| 3,762,326 A | 10/1973 | Edgell et al. | |
| 4,552,234 A | 11/1985 | Revett | |
| 4,756,371 A | 7/1988 | Brieger | |
| 8,622,132 B2 | 1/2014 | Coffey et al. | |
| 9,388,674 B2 | 7/2016 | Mitchell et al. | |
| 9,441,438 B2 | 9/2016 | Allison et al. | |
| 9,719,339 B2 | 8/2017 | Richard et al. | |
| 9,840,902 B2* | 12/2017 | Nguyen | C09K 8/40 |
| 9,845,666 B2 | 12/2017 | Hardesty et al. | |
| 10,184,326 B2 | 1/2019 | Flores | |
| 10,370,944 B2 | 8/2019 | McNelis et al. | |
| 10,870,793 B2 | 12/2020 | Cannan et al. | |
| 2005/0247447 A1 | 11/2005 | Spring et al. | |
| 2006/0048937 A1 | 3/2006 | Pinto et al. | |
| 2007/0131424 A1* | 6/2007 | Fripp | E21B 43/267 507/924 |
| 2008/0283243 A1* | 11/2008 | Rediger | E21B 43/267 166/276 |
| 2009/0014176 A1* | 1/2009 | Miller | C09K 8/805 166/280.1 |
| 2011/0024117 A1 | 2/2011 | Lopez De Cardenas et al. | |
| 2012/0279712 A1* | 11/2012 | Rogin | C09K 8/805 427/127 |

(Continued)

FOREIGN PATENT DOCUMENTS

RU    2627327    8/2017

OTHER PUBLICATIONS

[No Author Listed], "Spring Cylinders," Lehigh, 2018, 2 pages.

(Continued)

*Primary Examiner* — Andrew Sue-Ako
(74) *Attorney, Agent, or Firm* — Fish & Richardson P.C.

(57) ABSTRACT

Ferromagnetic proppant including 3D cross particle core and a ferromagnetic material. Methods of increasing the permeability of a subterranean zone, and methods of enhancing heavy oil recovery.

17 Claims, 18 Drawing Sheets

(56) References Cited

U.S. PATENT DOCUMENTS

2015/0284626 A1* 10/2015 Barron ................. E21B 43/267
                                                                                   166/280.2
2017/0051599 A1    2/2017 Bestaoui-Spurr et al.

OTHER PUBLICATIONS

U.S. Appl. No. 18/641,765, AlTammar et al., "Forming Perturbed In-Line Perforations," filed Apr. 22, 2024, 49 pages.

Altammar et al., "Theoretical and Experimental Comparison Study of Weak Point Shape Effect on Openhole Fracturing Pressure," Paper presented at the International Geomechanics Symposium, Abu Dhabi, UAE, Nov. 2022, The Aramco Journal of Technology, 2023, 12 pages.

Barrett et al. "Chain formation in a magnetic fluid under the influence of strong external magnetic fields studied by small angle neutron scattering," Soft Matter, 2011 7(14):6678-6683, 6 pages.

Bossis et al., "Magnetorheological fluids," Journal of Magnetism and Magnetic Materials, 2002, 252, 224-228, 5 pages.

Chang et al., "Multiple Fracture Initiation in Openhole Without Mechanical Isolation: First Step to Fulfill an Ambition," SPE-168638-MS, Paper presented at the SPE Hydraulic Fracturing Technology Conference, The Woodlands, Texas, USA, Feb. 2014, 18 pages.

Chen et al., "High Strength Lightweight Glass-Ceramics Sintered from Fly Ash: A Potential Proppant Material," Transactions of the Indian Ceramic Society, Aug. 1, 2013, 72(2): 124-129, 7 pages.

Chibulu et al., "Effect of Volume Fraction of Fine Sand on Magnetorheological Response And Blocking Mechanisms of Cementitious Mixtures Containing Fe304 Nanoparticles," Applied Sciences, Oct. 2022, 12(19):10104, 15 pages.

De Andrade et al., "A new loss circulation control strategy combining a cross-linkable polymer and magnetic fluid," Journal of Petroleum Science and Engineering, Sep. 2019, 180:958-966, 9 pages.

Elmobarak et al., "Application of magnetic nanoparticles for the removal of oil from oil-in-water emulsion: Regeneration/reuse of spent particles," Journal of Petroleum Science and Engineering, Aug. 2021, 203:108591, 14 pages.

Ermila et al., "Using Magneto-Rheological Fluids to Improve Mud Displacement Efficiency in Eccentric Annuli," SPE 160966, SPE Eastern Regional Meeting held in Lexington, Kentucky, USA, Oct. 3-5, 2012, 14 pages.

Fu et al., "Application of environmentally stimuli-responsive materials in the development of oil and gas field," Journal of Petroleum Science and Engineering, Sep. 2022, 219,(2):111088, 27 pages.

Guedes et al., "Innovative Gun System Tackles Today's Challenges to Unconventional Completions," URTEC-2020-3300 Paper presented at the Unconventional Resources Technology Conference held in Austin, Texas, USA, Jul. 20-22, 2020, 15 pages.

Zhou et al. "Application of magnetic nanoparticles in petroleum industry: A review," Journal of Petroleum Science and Engineering, 2020, 188:106943, 17 pages.

U.S. Appl. No. 18/642,400, AlTammar et al., Forming Perturbed In-Line Perforation Pairs, filed Apr. 22, 2024, 49 pages.

* cited by examiner

MATERIAL AND METHOD FOR FLOW DIVERSION IN PROPPANT FRACTURING

TECHNICAL FIELD

This document relates to methods and compositions used in treating subterranean formations for enhancing hydrocarbon fluid recovery.

BACKGROUND

Fracturing and well stimulation are methods for increasing oil recovery from tight/unconventional subterranean or subsurface resources. Tight and/or unconventional resources will not flow naturally because of extremely low hydraulic permeability. Therefore, a stimulation treatment is required, for example, hydraulic fracturing or matrix stimulation treatment. Fracturing and/or well stimulation treatment can involve injecting a stimulation fluid and/or multiple fluids in a single pumping operation at the target reservoir. During hydraulic fracturing, pumping is performed at a pressure higher than the rock fracturing pressure, which helps to initiate and propagate a crack in the targeted formation. In matrix stimulation treatment, injections are performed at a pressure lower than the fracturing pressure.

During a fracturing treatment, the high conductive channel connects the deeper part of the reservoir with the well, allowing for improvement in hydrocarbon production. Proppant, solid particles, or acid are used to distribute the treatment evenly across the targeted interval. This ensures an effective and homogenous treatment is achieved, which leads to better zonal production. Different types of diverters are used in these types of treatments depending on many factors, for example treatment objectives, formation type, and type of treatment. Diverters can include polymer-based viscoelastic surfactants, particulates, and foam. These diverters, however, have significant drawbacks. For example, extra equipment requirements, insufficient pressure response for flow diversion, and formation damage resulting from gel residues and pH of the delivery medium. For proppant-based fracturing, there are no effective flow diverters that can plug existing fractures and direct the flow to a new, unfractured zone.

SUMMARY

This disclosure provides methods and compositions used in treating subterranean formations for enhancing hydrocarbon fluid recovery.

In some implementations, a ferromagnetic proppant for use in subterranean formations includes a core. The core includes a 3D cross particle, wherein the 3D cross particle includes six arms protruding from a center point, each arm at a 90-degree angle to each of the four adjacent arms. The ferromagnetic proppant includes a first coating, wherein the first coating includes a ferromagnetic material.

In some implementations, a method of increasing the permeability of a subterranean zone includes placing a magnetic field tool in a wellbore, injecting a first fracturing fluid into the wellbore at a pressure higher than the closure stress of a formation surrounding the wellbore, initiating and propagating a fracture, injecting a second fracturing fluid including a suspension of ferromagnetic proppant into the wellbore, activating the magnetic field tool to generate a magnetic field, plugging an existing fracture using the ferromagnetic proppant, and diverting the first and/or second fracturing fluid to a new zone. The ferromagnetic proppant includes a core. The core includes a 3D cross particle, wherein the 3D cross particle includes six arms protruding from a center point, each arm at a 90-degree angle to each of the four adjacent arms. The ferromagnetic proppant includes a first coating, wherein the first coating includes a ferromagnetic material.

In some implementations, a method of enhancing heavy oil recovery includes placing a magnetic field tool in a wellbore in a subterranean formation, introducing ferromagnetic particles into the subterranean formation through the wellbore; and generating an alternating magnetic field in the subterranean formation using the magnetic field tool.

The details of one or more implementations of the disclosure are set forth in the accompanying drawings and the description that follows. Other features, objects, and advantages of the disclosure will be apparent from the description and drawings, and from the claims.

DESCRIPTION OF DRAWINGS

Like reference symbols in the various drawings indicate like elements.

DETAILED DESCRIPTION

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Figure 1:
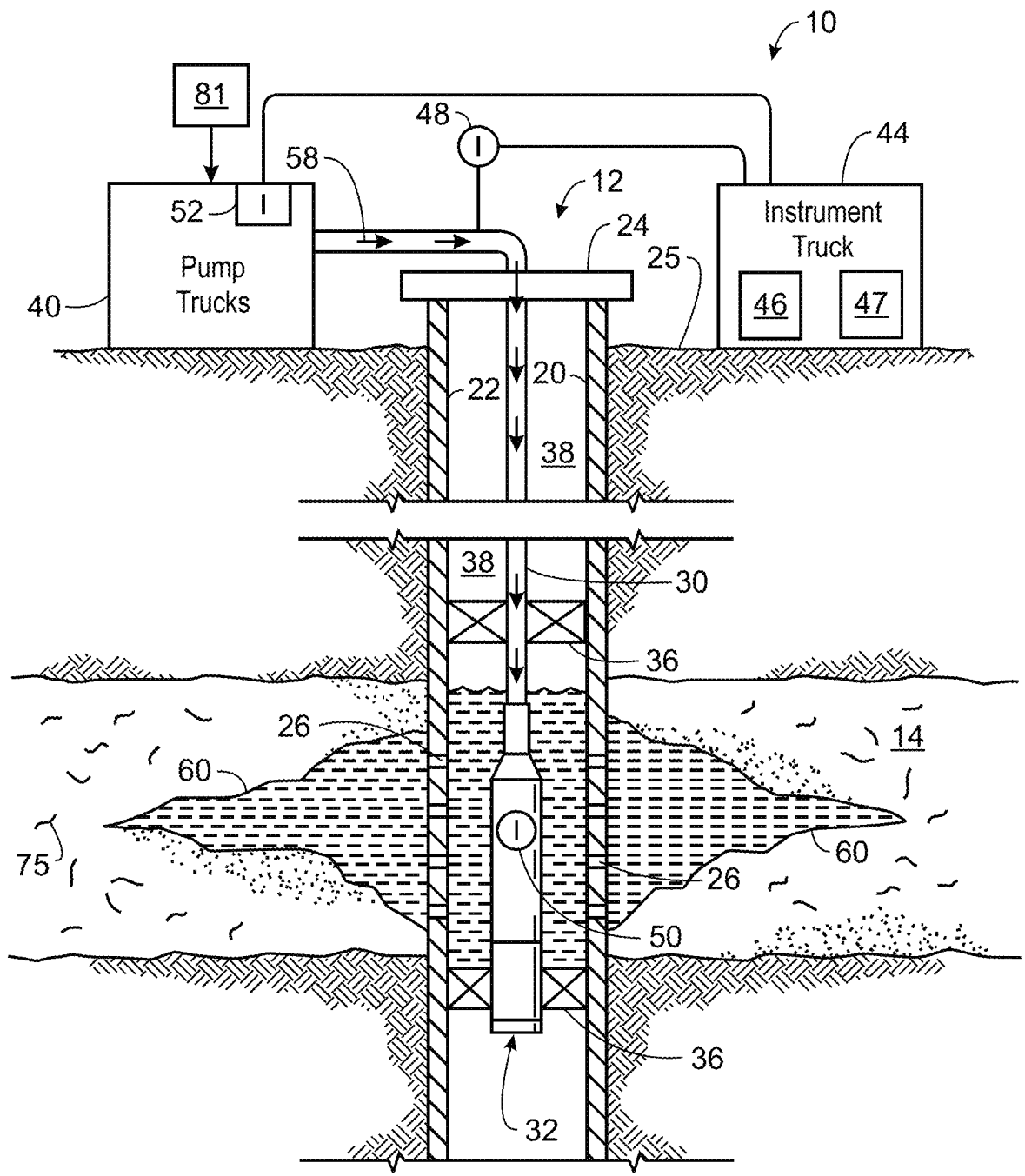
FIG. 1 shows an example of a fracture treatment for a well.

FIG. 1 illustrates an example of a drilling operation 10 for a well 12. The well 12 can be in a wellbore 20 formed in a subterranean zone 14 of a geological formation in the Earth's crust. The subterranean zone 14 can include, for example, a formation, a portion of a formation, or multiple formations in a hydrocarbon-bearing reservoir from which recovery operations can be practiced to recover trapped hydrocarbons. Examples of unconventional reservoirs include tight-gas sands, gas and oil shales, coalbed methane, heavy oil and tar sands, gas-hydrate deposits, to name a few. In some implementations, the subterranean zone 14 includes an underground formation including natural fractures 60 in rock formations containing hydrocarbons (for example, oil, gas, or both). For example, the subterranean zone 14 can include a fractured shale. In some implementations, the well 12 can intersect other suitable types of formations, including reservoirs that are not naturally fractured in any significant amount.

The well 12 can include a casing 22 and well head 24. The wellbore 20 can be a vertical, horizontal, deviated, or multilateral bore. The casing 22 can be cemented or otherwise suitably secured in the wellbore 20. Perforations 26 can be formed in the casing 22 at the level of the subterranean zone 14 to allow oil, gas, and by-products to flow into the well 12 and be produced to the surface 25. Perforations 26 can be formed using shape charges, a perforating gun, or otherwise.

For a drilling treatment 10, a work string 30 can be disposed in the wellbore 20. The work string 30 can be coiled tubing, sectioned pipe, or other suitable tubing. A drilling tool or drill bit 32 can be coupled to an end of the work string 30. Packers 36 can seal an annulus 38 of the wellbore 20 uphole of and downhole of the subterranean zone 14. Packers 36 can be mechanical, fluid inflatable, or other suitable packers.

One or more pump trucks 40 can be coupled to the work string 30 at the surface 25. The pump trucks 40 pump drilling mud 58 down the work string 30 to lubricate and cool the drilling tool or drill bit 32, maintain hydrostatic pressure in the wellbore, and carry subterranean cuttings to the surface. The drilling mud 58 can include a fluid pad, proppants, flush fluid, or a combination of these components. The pump trucks 40 can include mobile vehicles, equipment such as skids, or other suitable structures.

One or more instrument trucks 44 can also be provided at the surface 25. The instrument truck 44 can include a drilling control system 46 and a drilling simulator 47. The drilling control system 46 monitors and controls the drilling treatment 10. The drilling control system 46 can control the pump trucks 40 and fluid valves to stop and start the drilling treatment 10. The drilling control system 46 communicates with surface and subsurface instruments to monitor and control the drilling treatment 10. In some implementations, the surface and subsurface instruments may comprise surface sensors 48, down-hole sensors 50, and pump controls 52.

Additives 81 can be mixed with drilling mud 58 and flowed through the reservoir. In some implementations, the additives include proppant. Proppant is a solid composition that is introduced into a wellbore to improve oil recovery. The physical properties of proppants are shown in Table 1. As used herein, the mesh size of the sieve used to test proppant is typically specified in terms of the number of wires per inch in the standard U.S. sieve screens. For example, a mesh size of 30/50 indicates that the sieve has 30 to 50 wires per inch. A mesh size of 90 indicates that the sieve has 90 wires per inch (90 wires per 2.54 cm). Typical proppant sizes are generally between 8 and 140 mesh (106 μm-2.36 mm openings), for example 16-30 mesh (600 μm-1180 μm openings), 20-40 mesh (420 μm-840 μm openings), 30-50 mesh (300 μm-600 μm openings), 40-70 mesh (212 μm-420 μm openings) or 70-140 mesh (106 μm-212 μm openings).

TABLE 1

Physical Properties of Proppant

| Property | Values Range | Values Unit |
|---|---|---|
| Specific Gravity | 2.7-3.7 | g/cc |
| Acid Solubility | <7.0 | Wt % |
| Roundness* | >0.7 | — |
| Bulk Density | 1.4-2.0 | g/cc |
| Crush Resistance | <10.0 | Wt % |
| Sieve Analysis | >90 | wires per inch |

Provided in this disclosure are methods, compositions, and systems for improving flow diversion in proppant fracturing treatment. In some embodiments, the compositions include proppant that includes magnetic material.

The proppant particles described herein can be added to a number of different fluids. For example, the proppant can be suspended in a carrier fluid to transport the particles from the surface to a downhole location. The carrier fluid has sufficient suspension capability to transport and suspend the particles. In some embodiments, the carrier fluid is a highly viscous fracturing fluid. The fracturing fluid can include water and other additives that can be used to tailor the viscosity of the fracturing fluid. An example composition of fracturing fluid is shown in Table 2. The Zr- and B-crosslinkers may enhance the viscosity and stability of the fracturing fluid. The crosslinkers crosslink the linear gel or the polymer, for example gaur gum and its derivatives, enabling effective proppant transport, thermal stability, and fracture geometry generation in subterranean formations.

TABLE 2

Composition of a Fracturing Fluid

| Component | Example | Concentration |
|---|---|---|
| Polymer | carboxymethyl hydroxypropyl guar (CMHPG) | 45 pounds per thousand gallons (ppt)/ 0.0054 kg/L |
| High-temperature stabilizer | sodium thiosulfate | 9 gallons per thousand gallons (gpt)/ 9 liters per thousand liters |
| Zr-crosslinker | Zirconium triethanolamine | 0.8 gpt |
| B-crosslinker | Potassium metaborate | 0.1 gpt |

Figure 2:
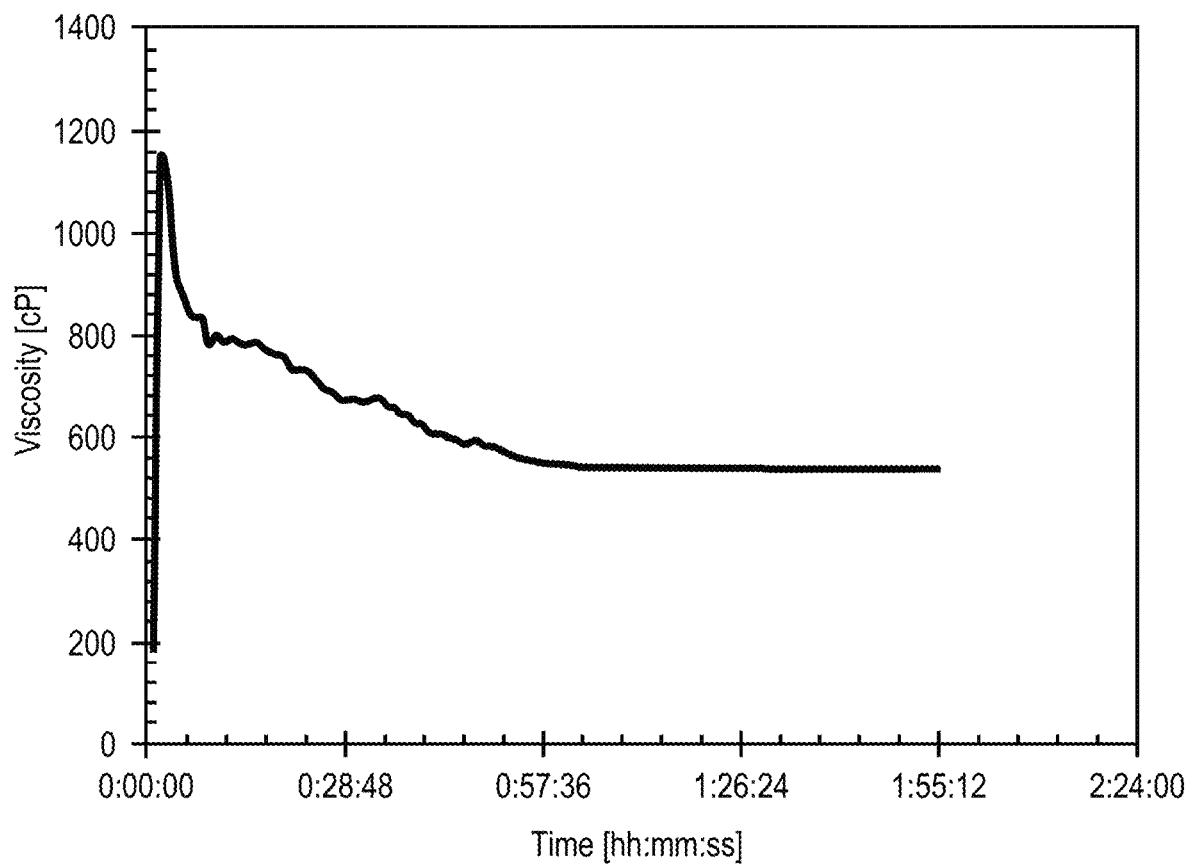
FIG. 2 shows an example of a typical rheology of a fracturing fluid system.

The viscosity of the fracturing fluid allows the fracturing fluid to carry the particles. FIG. 2 shows an example of a typical rheology of a fracturing fluid system. The composition of the fracturing fluid is shown in Table 2. The rheology test shown in FIG. 2 was performed at a constant pressure of 500 psi and a shear rate of 100 s$^{-1}$.

Described herein are types of proppant that can be used in fracturing and drilling operations. In some embodiments, the proppant is a ferromagnetic proppant. Ferromagnetic proppant includes a core and a ferromagnetic coating. The core of the proppant can include sand, treated sand, ceramic material, or a 3D printed material. The 3D printed material can be created by 3D printing particles with a plastic filament, for example, with an acrylonitrile butadiene styrene plastic filament. Accordingly, in some embodiments, the core includes acrylonitrile butadiene styrene. The selection of the type of core can be based on the closure stress of the formation. The size of the core can be adjusted based on the needs of the fracturing operation, drilling operation, or subterranean formation. In some embodiments, the proppant core is a nano-scale core. In some embodiments, the core is less than 10 nm in diameter. In some embodiments, the core is less than 5 nm in diameter. In some embodiments, the core is between about 1 to about 10 nm in diameter. In some embodiments, the core is between about 2 to about 8 nm in diameter. For example, the core can be about 2, about 3, about 4, about 5, about 6, about 7, or about 8 nm in diameter. In some embodiments, the proppant core is a macroscale core, i.e., in the range of about 0.1 to about 1.0 cm (about 0.04 to about 0.4 inches). In some embodiments, the core is between 0.1-0.8 cm (0.05-0.3 inches) in diameter. For example, the core can be about 0.1, about 0.2, about 0.3 about 0.4, about 0.5, about 0.6, about 0.7, or about 0.8 cm in diameter.

The ferromagnetic proppant includes a core with a first coating. The first coating is a ferromagnetic coating. In some embodiments, the ferromagnetic coating includes iron oxide, for example $\varphi\text{-}Fe_2O_3$, $K\text{—}Fe_2O_3$, or $Fe_3O_4$. The core of the ferromagnetic proppant can be coated with the ferromagnetic coating using a number of acceptable coating processes. For example, an iron oxide powder can be mixed with a resin to form an iron oxide suspension. The core can then be coated with the iron oxide suspension. In some embodiments, the core of the proppant is coated with iron oxide by preparing an aqueous solution of iron oxide, and mixing the aqueous iron oxide with the core of the proppant. In more detail, a proppant core is provided. The core can include sand, ceramic materials, or a 3D printed core. The 3D printed material can be created by 3D printing particles with a plastic filament, for example, with an acrylonitrile butadiene styrene plastic filament. Accordingly, in some embodiments, the core includes acrylonitrile butadiene styrene. In some embodiments, the proppant core can be cleaned before coating. For example, the proppant core can be cleaned using a preflush. In some embodiments, the preflush includes surfactants. For proppant cores that include sand, the surfactant can improve the surface of the sand grains. In some embodiments, the preflush includes a sodium carbonate solution. For proppant cores that include sand, a sodium carbonate preflush imparts a negative charge on the sand particles, which helps in the adhesion of the magnetic particles. To form the ferromagnetic proppant, the proppant core is mixed with a magnetizing fluid. The magnetizing fluid includes water and particles of a magnetic material. The magnetic material can include iron oxide, for example, $\varphi\text{-}Fe_2O_3$, $K\text{—}Fe_2O_3$, or $Fe_3O_4$, or any combination thereof. In some embodiments, the magnetic material includes titanium dioxide, ferric ions, or magnetite ions, or any combination thereof. Mixing the proppant core with the magnetizing fluid coats the proppant cores with a ferromagnetic coating to yield a ferromagnetic proppant.

Figure 3:
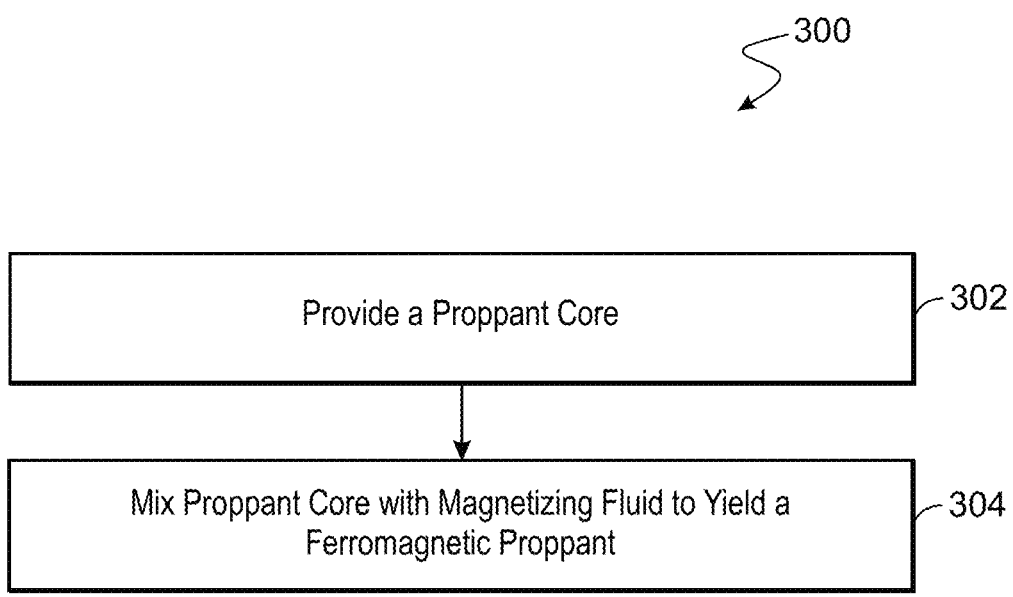
FIG. 3 is a flow chart of an example method of synthesizing a ferromagnetic proppant.

FIG. 3 shows a flow chart of an example method 300 of synthesizing a ferromagnetic proppant. At 302, a proppant core is provided. The core can include sand, ceramic materials, or a 3D printed core. The 3D printed material can be created by 3D printing particles with a plastic filament, for example, with an acrylonitrile butadiene styrene plastic filament. Accordingly, in some embodiments, the core includes acrylonitrile butadiene styrene. In some embodiments, the proppant core can be cleaned. For example, the proppant core can be cleaned using a preflush. In some embodiments, the preflush includes surfactants. In some embodiments, the preflush includes a sodium carbonate solution. At 304, the proppant core is mixed with a magnetizing fluid. The magnetizing fluid includes water and particles of a magnetic material. The magnetic material can include iron oxide, for example, $\varphi\text{-}Fe_2O_3$, $K\text{—}Fe_2O_3$, or $Fe_3O_4$, or any combination thereof. In some embodiments, the magnetic material includes titanium dioxide, ferric ions, or magnetite ions, or any combination thereof. Mixing the proppant core with the magnetizing fluid coats the proppant cores with a ferromagnetic coating to yield a ferromagnetic proppant.

In some embodiments, the ferromagnetic proppant includes a second coating, where the second coating is coated on top of the first coating. The second coating includes titanium dioxide. The titanium dioxide coating is coated on top of the ferromagnetic coating. In some embodiments, the second coating is applied using polymeric dispersion. In some embodiments, the ferromagnetic proppant is cleaned using a preflush before polymeric dispersion. The preflush can include surfactants to improve the surface of the particles. The preflush can include a sodium carbonate solution. A sodium carbonate solution can be used to impart a negative charge on any exposed sand of the ferromagnetic proppant. To coat the ferromagnetic proppant, a polymeric dispersion of titanium dioxide is prepared. The polymeric dispersion of titanium dioxide includes titanium dioxide particles and a polymer. For example, the polymer can include poly(2-dimethylaminoethyl methacrylate), cellulose aerogels, poly(lactic-co-glycolic acid), or polyvinylpyrrolidone. The ferromagnetic proppant is mixed with the polymeric dispersion of titanium dioxide to yield the coated ferromagnetic proppant.

Figure 4:
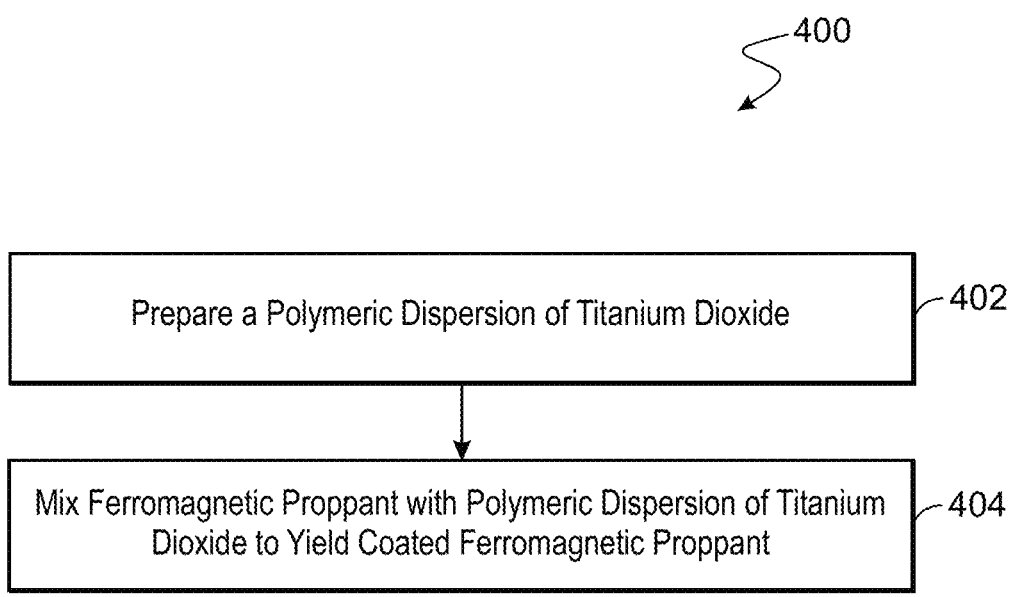
FIG. 4 is a flowchart of an example method of coating a ferromagnetic proppant using polymeric dispersion.

FIG. 4 shows a flowchart of an example method 400 of coating ferromagnetic proppant using polymeric dispersion. In some embodiments, the ferromagnetic proppant is cleaned using a preflush. The preflush can include a sodium carbonate solution. At 402, a polymeric dispersion of titanium dioxide is prepared. The polymeric dispersion of titanium dioxide includes titanium dioxide particles and a polymer. In some embodiments, the polymer includes poly (2-dimethylaminoethyl methacrylate), cellulose aerogels, poly(lactic-co-glycolic acid), or polyvinylpyrrolidone. At 404, the ferromagnetic proppant is mixed with the polymeric dispersion of titanium dioxide to yield the coated ferromagnetic proppant.

Figure 5:
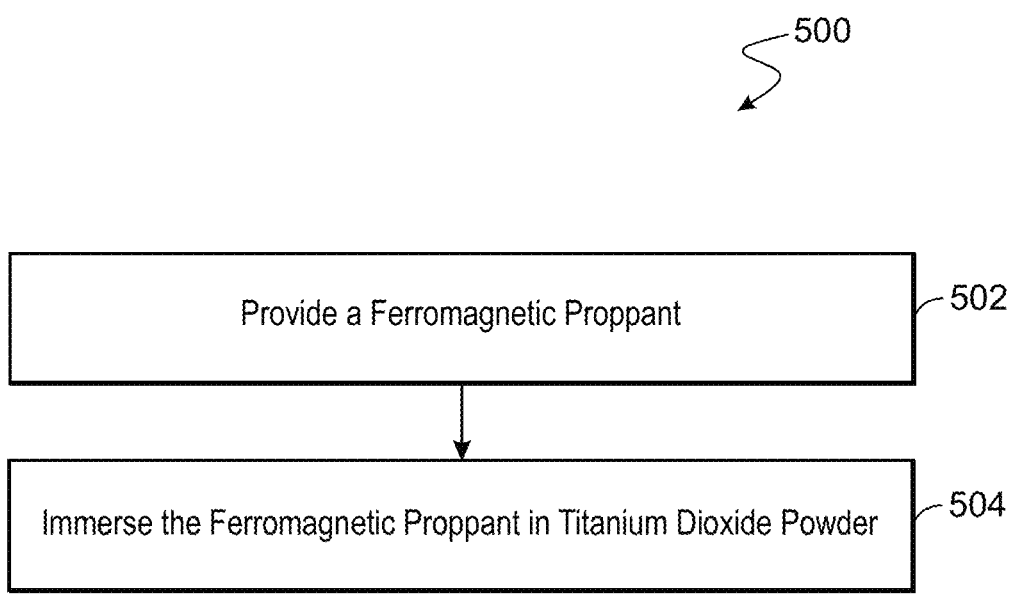
FIG. 5 is a flowchart of an example method of coating a ferromagnetic proppant.

In some embodiments, a deposition method is used to coat the ferromagnetic proppant with titanium dioxide. In some embodiments, ferromagnetic proppant is immersed in a titanium dioxide powder. FIG. 5 shows a flowchart of an example method 500 of coating ferromagnetic proppant. At 502, a ferromagnetic proppant is provided. At 504, the ferromagnetic particle is immersed in titanium dioxide powder to yield the coated ferromagnetic particle.

In some embodiments, a ferromagnetic proppant is coated with titanium dioxide using resin. In more detail, titanium dioxide powder is mixed with a resin to yield a titanium dioxide suspension. In some embodiments, the resin can include phenolics, for example, Novolac, phenolic polyurethane, polyurethanes, or phenolic resoles. The titanium dioxide suspension is mixed with the ferromagnetic proppant to yield a coated ferromagnetic proppant. In some embodiments, mixing the titanium dioxide suspension with the ferromagnetic proppant includes mixing the titanium dioxide suspension and the ferromagnetic proppant in a blender.

Figure 6:
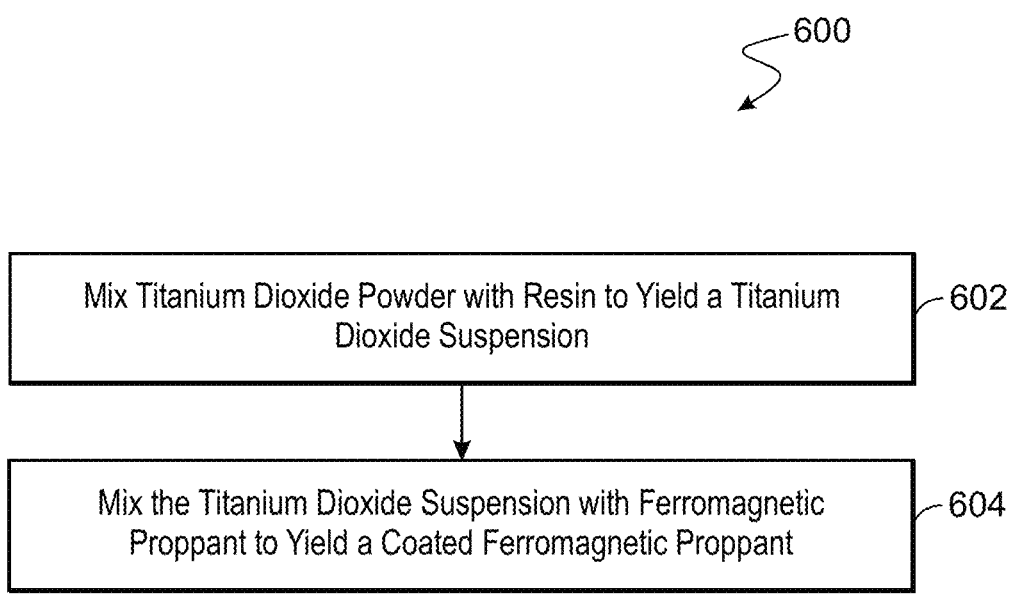
FIG. 6 is a flowchart of an example method of coating a ferromagnetic proppant with titanium dioxide.

FIG. 6 shows a flowchart of an example method 600 of coating a ferromagnetic proppant with titanium dioxide. At 602, titanium dioxide powder is mixed with a resin to yield a titanium dioxide suspension. The resin can include phenolics, for example, Novolac, phenolic polyurethane, polyurethanes, or phenolic resoles. At 604, the titanium dioxide suspension is mixed with ferromagnetic proppant to yield a coated ferromagnetic proppant.

The proppants described herein can be used during fracturing. After fracturing is completed and proppant is placed and packed inside the fracture, flowback of the well is initiated to evaluate the well production performance. Depending on many factors, for example proppant embedment, proppant size, and differential pressure, there is the possibility that the proppant will flow back with the production fluids. This can lead to production loss, a decline in the fracture conductivity, or closure of the existing fractures. Proppant that is coated with titanium dioxide can prevent proppant flow back. The titanium dioxide resin coating traps particle debris in the coating. This helps prevent the proppant from flowing back into the wellbore. In addition, the titanium dioxide resin coating acts as a bonding agent, adhering the proppants to the fracture walls. This bonding effect helps to anchor the proppants in place, reducing the likelihood of proppant being displaced and flowing back into the wellbore. Further, titanium dioxide can exhibit superparamagnetic properties. Superparamagnetic materials can be magnetized by an external magnetic field. In addition, the titanium dioxide coating improves the stability of the nanoparticles. Particles coated with titanium dioxide can withstand loads up to 1.00 times their own weight. The strength of coated ferromagnetic proppant varies and can reach 34 up to 60 GPa of compressive strength. The titanium dioxide coating can increase the strength of the coated ferromagnetic proppant depending on the concentration used. The titanium oxide can double the strength of the proppant.

Figure 7:
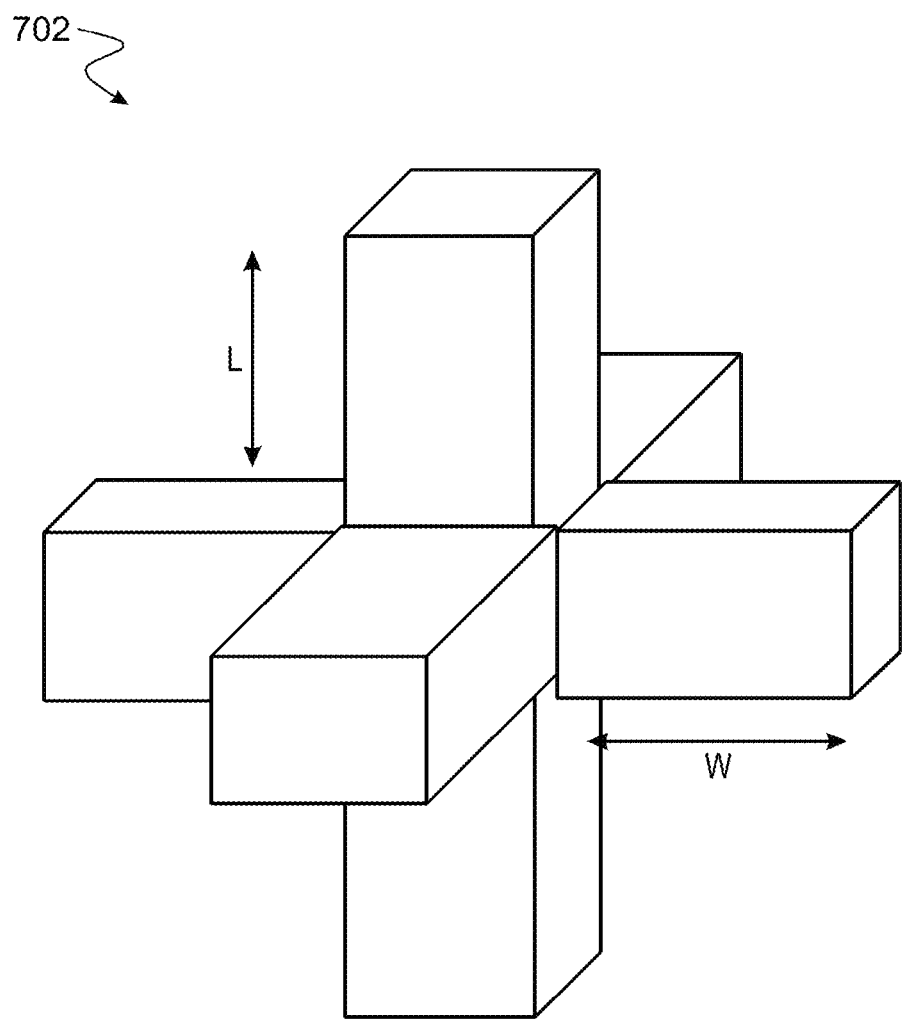
FIG. 7 shows an example schematic of a 3D cross particle.

In some embodiments, a proppant includes a 3D cross particle. FIG. 7 shows an example schematic of a 3D cross particle 702. The 3D cross particle includes six arm sections with a length (L) and width (W). In some embodiments, the length and width of the particles is substantially equal. The arm sections protrude from a center point and are arranged at 90-degree angles with respect to each of the four adjacent arm sections. In other words, a 3D cross particle includes six arm sections that are arranged such that the end of each arm terminates at a vertex of a figurative octahedron. In some embodiments, the length of each arm section is substantially the same. In some embodiments, each arm section is substantially rectangular in shape, as shown in FIG. 7. In some embodiments, each arm section is substantially cylindrical in shape.

The length (L) and width (W) of the 3D cross particles can be selected and manufactured depending on the characteristics of the fracturing treatment. In some embodiments, the dimensions of the 3D cross particle are less than a fracture width. For example, the length and/or width of the 3D cross particles can be in the range of about 0.1 to about 1.0 cm (about 0.04 to about 0.4 inches). In some embodiments, the 3D cross particle is between 0.1-0.8 cm (0.05-0.3 inches) in length and/or width. For example, the length and/or width can be about 0.1, about 0.2, about 0.3 about 0.4, about 0.5, about 0.6, about 0.7, or about 0.8 cm.

In some embodiments, the 3D cross particles are manufactured by 3D printing. In some embodiments, the 3D cross particles are 3D printed with acrylonitrile butadiene styrene plastic filament. Accordingly, the 3D cross particles include acrylonitrile butadiene styrene plastic.

Figure 8:
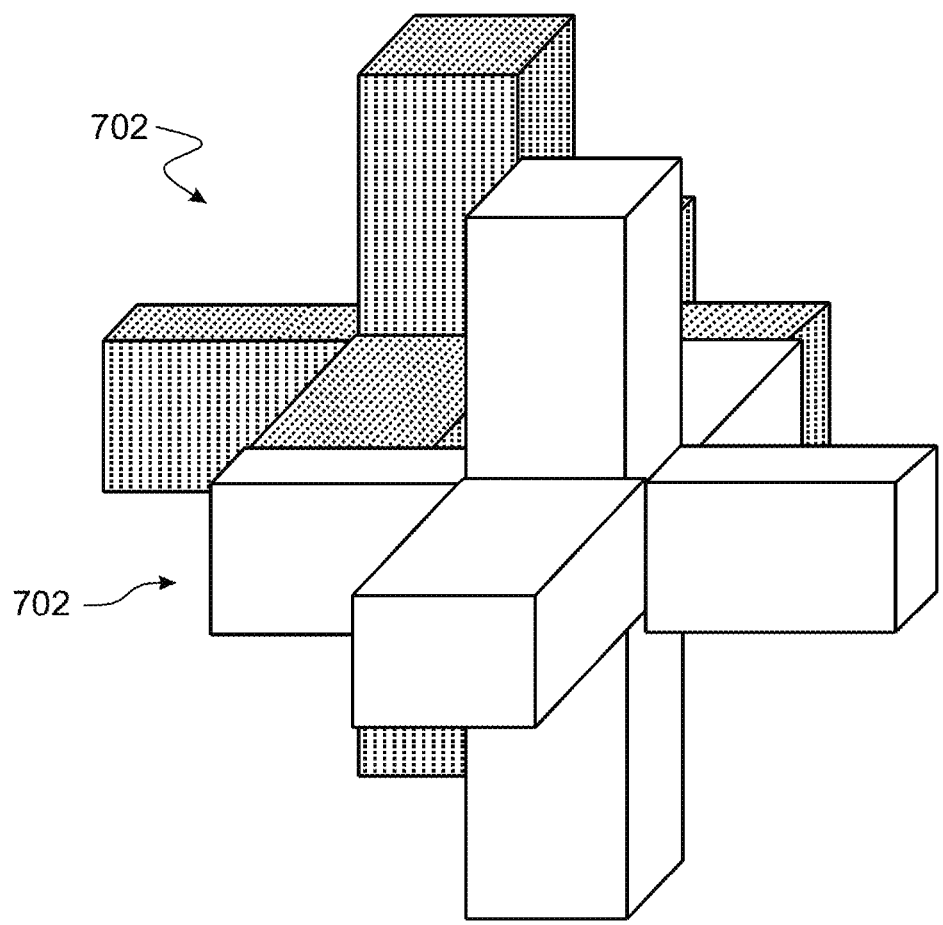
FIG. 8 shows an example schematic of interlocked 3D cross particles.

As the 3D cross particles 702 enter an existing hydraulic fracture, the geometry of the particles allows for an effective particle to particle interaction. The accumulated 3D cross particles will interlock with each other, as shown in FIG. 8. The interlocked 3D cross particles reduce the conductivity of the aggregated particles, thereby enhancing the bridging and blocking of existing fractures. The 3D cross particles improve the proppant's plugging efficiency. Advantageously, no chemical crosslinking is required to generate the crosslinked particles, which will naturally align and crosslink as shown in FIG. 8. The interlocking mechanism of 3D cross particles improves fracture plugging and productivity, and enhances a stimulation treatment.

In some embodiments, the 3D cross particles are coated with a first coating that includes a ferromagnetic material to yield a 3D ferromagnetic proppant. In some embodiments, the ferromagnetic material includes iron oxide. In some embodiments, the iron oxide is $\varphi\text{-Fe}_2O_3$, $K\text{—Fe}_2O_3$, or $Fe_3O_4$. The 3D cross particles can be coated by a resin coating process. For example, iron oxide powder can be mixed into a resin to form an iron oxide suspension. The iron oxide suspension can then be coated on the 3D cross particles to yield a 3D ferromagnetic proppant. In more detail, the 3D cross particles are soaked in a surfactant. Iron oxide powder is mixed with a resin to yield an iron oxide suspension. In some embodiments, the iron oxide is $\varphi\text{-Fe}_2O_3$, $K\text{—Fe}_2O_3$, or $Fe_3O_4$. In some embodiments, the resin can include phenolics, for example, Novolac, phenolic polyurethane, polyurethanes, or phenolic resoles. The iron oxide suspension is mixed with the 3D cross particles to yield a 3D ferromagnetic proppant. In some embodiments, mixing the iron oxide suspension with the 3D cross particles includes mixing the iron oxide suspension and the 3D cross particles in a blender.

Figure 9:
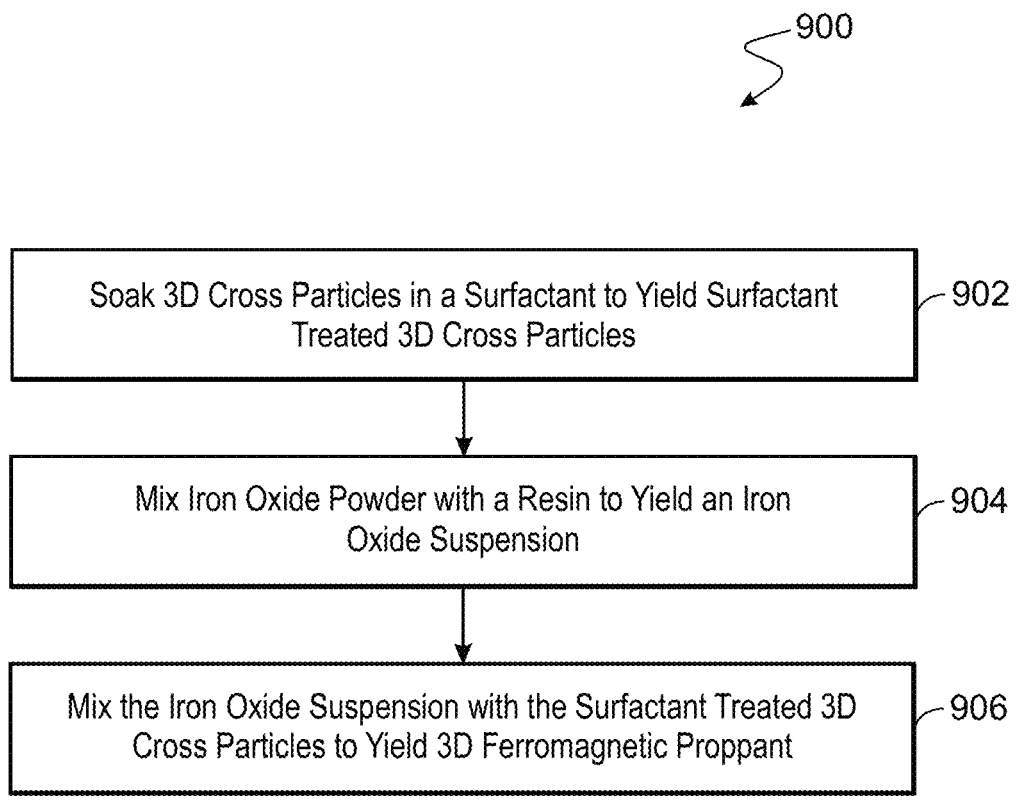
FIG. 9 is a flowchart of an example method of coating a 3D cross particles with iron oxide.

FIG. 9 shows a flowchart of an example method 900 of coating 3D cross particles with iron oxide. At 902, the 3D cross particles are soaked in a surfactant to yield surfactant treated 3D cross particles. At 904, iron oxide powder is mixed with a resin to yield an iron oxide suspension. The resin can include phenolics, for example, Novolac, phenolic polyurethane, polyurethanes, or phenolic resoles. At 906, the iron oxide suspension is mixed with the surfactant treated 3D cross particles to yield 3D ferromagnetic proppant. The 3D ferromagnetic proppant provides an advantageous bridging mechanism due to the alignment of the particles along a magnetic field, creating a chain-like structure that can be used to seal conductive fractures. The magnetic field can be an external magnetic field, or a naturally occurring subterranean magnetic field.

In some embodiments, the 3D ferromagnetic proppant is coated with a second coating, where the second coating is coated on top of the first coating. The second coating includes titanium dioxide ($TiO_2$). Titanium dioxide can exhibit superparamagnetic properties and can improve the stability of the nanoparticles. Particles coated with titanium dioxide can withstand loads up to 1.00 times their own weight. The strength of coated 3D ferromagnetic proppant varies and can reach 34 up to 60 GPa of compressive strength. The titanium dioxide coating can increase the strength of the 3D coated ferromagnetic proppant depending on the concentration used. The titanium oxide can double the strength of the proppant. In some embodiments, the second coating is applied using polymeric dispersion. In some embodiments, the 3D ferromagnetic proppant is cleaned using a preflush before polymeric dispersion. The preflush can include surfactants to improve the surface of the particles. The preflush can include a sodium carbonate solution. A sodium carbonate solution can be used to impart a negative charge on any exposed sand of the ferromagnetic proppant. To coat the 3D ferromagnetic proppant, a polymeric dispersion of titanium dioxide is prepared. The polymeric dispersion of titanium dioxide includes titanium dioxide particles and a polymer. For example, the polymer can include poly(2-dimethylaminoethyl methacrylate), cellulose aerogels, poly(lactic-co-glycolic acid), or polyvinylpyrrolidone. The 3D ferromagnetic proppant is mixed with the polymeric dispersion of titanium dioxide to yield the coated ferromagnetic proppant.

Figure 10:
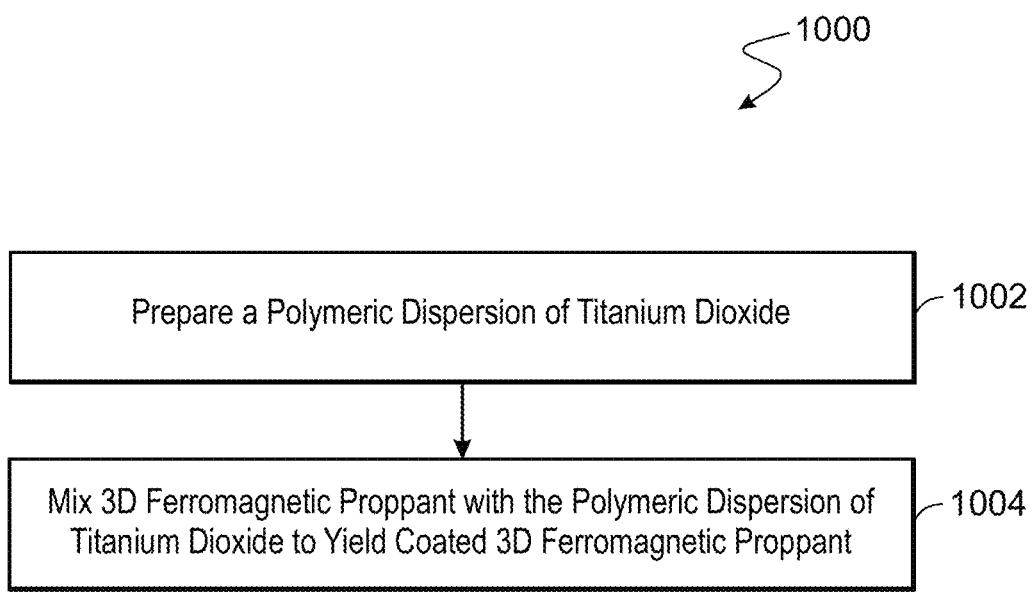
FIG. 10 is a flowchart of an example method of coating a 3D ferromagnetic proppant using polymeric dispersion.

FIG. 10 shows a flowchart of an example method 1000 of coating 3D ferromagnetic proppant using polymeric dispersion. In some embodiments, the 3D ferromagnetic proppant is cleaned using a preflush. The preflush can include a sodium carbonate solution. At 1002, a polymeric dispersion of titanium dioxide is prepared. The polymeric dispersion of titanium dioxide includes titanium dioxide particles and a polymer. In some embodiments, the polymer includes poly(2-dimethylaminoethyl methacrylate), cellulose aerogels, poly(lactic-co-glycolic acid), or polyvinylpyrrolidone. At 1004, the 3D ferromagnetic proppant is mixed with the polymeric dispersion of titanium dioxide to yield the coated 3D ferromagnetic proppant.

Figure 11:
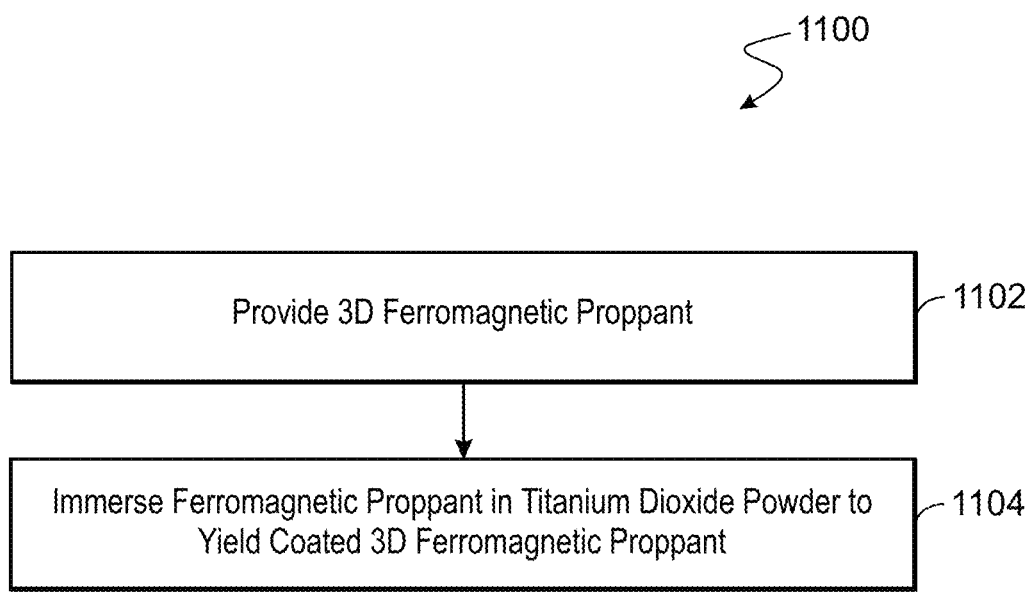
FIG. 11 is a flowchart of an example method of coating a 3D ferromagnetic proppant.

In some embodiments, a deposition method is used to coat the 3D ferromagnetic proppant with titanium dioxide. In some embodiments, 3D ferromagnetic proppant is immersed in a titanium dioxide powder. FIG. 11 shows a flowchart of an example method 1100 of coating 3D ferromagnetic proppant. At 1102, a ferromagnetic proppant is provided. At 1104, the 3D ferromagnetic proppant is immersed in titanium dioxide powder to yield the coated 3D ferromagnetic particle.

In some embodiments, a 3D ferromagnetic proppant is coated with titanium dioxide using resin. In more detail, titanium dioxide powder is mixed with a resin to yield a titanium dioxide suspension. In some embodiments, the resin can include phenolics, for example, Novolac, phenolic polyurethane, polyurethanes, or phenolic resoles. The titanium dioxide suspension is mixed with the 3D ferromagnetic proppant to yield a coated 3D ferromagnetic proppant. In some embodiments, mixing the titanium dioxide suspension with the 3D ferromagnetic proppant includes mixing the titanium dioxide suspension and the 3D ferromagnetic proppant in a blender.

Figure 12:
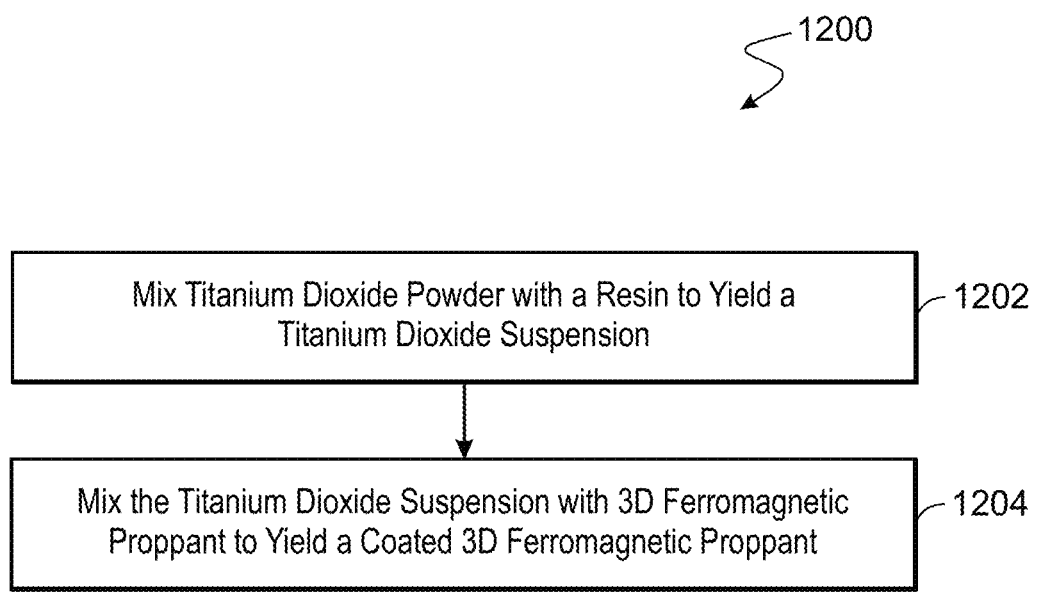
FIG. 12 is a flowchart of an example method of coating a 3D ferromagnetic proppant with titanium dioxide.

FIG. 12 shows a flowchart of an example method 1200 of coating a 3D ferromagnetic proppant with titanium dioxide. At 1202, titanium dioxide powder is mixed with a resin to yield a titanium dioxide suspension. The resin can include phenolics, for example, Novolac, phenolic polyurethane, polyurethanes, or phenolic resoles. At 1204, the titanium dioxide suspension is mixed with 3D ferromagnetic proppant to yield a coated 3D ferromagnetic proppant.

Advantageously, the 3D ferromagnetic proppant and coated 3D ferromagnetic proppant do not exhibit magnetic behavior until a magnetic field is present. In the absence of a magnetic field, these particles will not stick to metal tubing or components of the drilling system. Accordingly, the particles will not become stuck to equipment while being introduced into the wellbore or flowing through the subterranean formation. After being injected into a subterranean formation, the 3D ferromagnetic proppant and/or coated 3D ferromagnetic proppant can be exposed to a magnetic field The magnetic field can be an external magnetic field that is introduced into the wellbore, or the magnetic field can be a naturally occurring magnetic field within the subterranean formation. In some embodiments, the magnetic field is generated by a magnetic field tool placed in the wellbore.

The 3D ferromagnetic proppant and/or coated 3D ferromagnetic proppant can be used to increase the permeability of a subterranean zone by creating new fractures in new intervals during proppant fracturing. Initially, fractures will be initiated in low stress/high permeability regions, relative to the permeability profile of the well. The initial fracture may not cover the entire reservoir thickness. Therefore, there is a need to clog existing fractures and divert the flow of fracturing fluid to new zones. This can be achieved using 3D ferromagnetic proppant and/or coated 3D ferromagnetic proppant. The proppants can be introduced into a subterranean formation, for example, through the wellbore. The introduction of a magnetic field, for example, by a magnetic field tool, will cause the 3D ferromagnetic proppant and/or coated 3D ferromagnetic proppant to aggregate along the magnetic field direction and plug the existing fractures, allowing for flow diversion to new fractures or zones.

Figure 13:
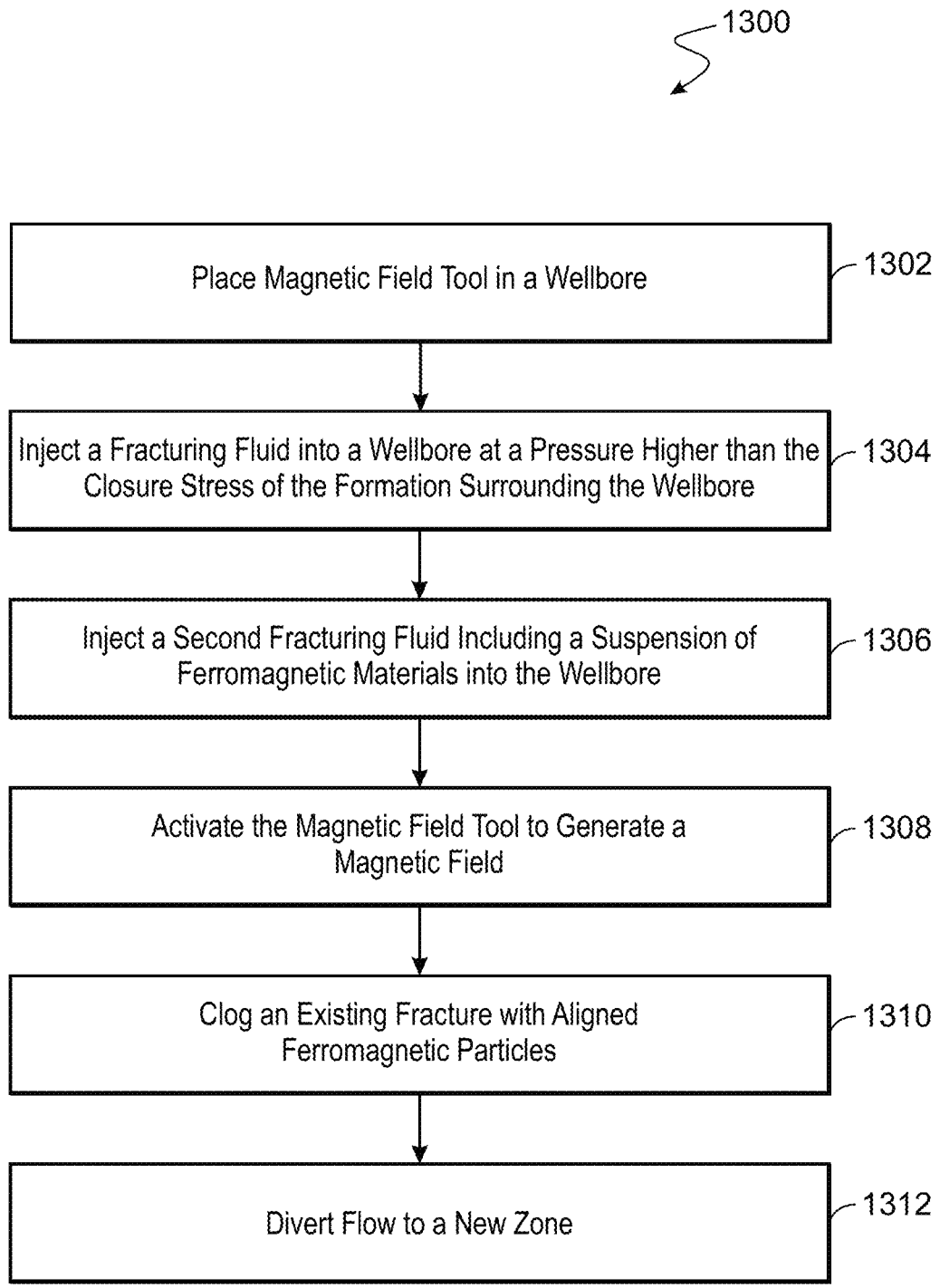
FIG. 13 is a flow chart of an example method of increasing the permeability of a subterranean zone.

FIG. 13 is a flow chart of an example method 1300 of increasing the permeability of a subterranean zone. At time to, a magnetic field tool is placed in a wellbore. At time $t_1$, a fracturing fluid is injected into the wellbore at a pressure higher than the closure stress of the formation surrounding the wellbore. At 1304, a fracture is initiated and propagated. At 1306 or time $t_2$, a second fracturing fluid including a suspension of ferromagnetic materials is injected into the wellbore. In some embodiments, the ferromagnetic materials include 3D ferromagnetic proppant. In some embodiments, the 3D ferromagnetic proppant is coated with $TiO_2$. In some embodiments, the ferromagnetic materials, for example, the 3D ferromagnetic proppant, are present in the second fracturing fluid at a concentration from about 0.5 pounds per gallon (ppg) to about 6 pounds per gallon (about 0.06 kg/L to about 0.72 kg/L). In some embodiments, the ferromagnetic materials are present in the second fracturing fluid at a concentration of about 1 pound per gallon to about 4 pounds per gallon (about 0.12 kg/L to about 0.48 kg/L). In some embodiments, the ferromagnetic materials are present in the second fracturing fluid at a concentration of about 0.5 ppg (about 0.06 kg/L), about 1 ppg (about 0.12 kg/L), about 2 ppg (about 0.24 kg/L), about 3 ppg (about 0.36 kg/), about 4 ppg (0.48 kg/L), about 5 ppg (about 0.60 kg/L), or about 6 ppg (about 0.72 kg/L). At 1308 or time $t_3$, the magnetic field tool is activated to generate a magnetic field. In some embodiments, the magnetic field strength can vary from about 0.5 to about 1 Tesla (T). In response to the magnetic field, the ferromagnetic particles align along the magnetic field direction. This alignment will form a chain structure that transforms the suspension into a plug. At 1310, the plug clogs the existing fracture. At 1312 or time $t_4$, the plug diverts the flow of fracturing fluid to a new zone. In some embodiments, the magnetic field tool is deactivated, i.e., the magnetic field is turned off, and the chain structure of the ferromagnetic materials breaks apart, thus releasing any clog in the formation. The reversibility of the method is advantageous to the fracture conductivity.

In some embodiments, the fluid circulation and pressure are monitored to assess the effectiveness of the ferromagnetic material in preventing or reducing lost circulation. Adjustments can be made to the concentration of the 3D ferromagnetic proppant and/or coated 3D ferromagnetic proppant if necessary.

Figure 14:
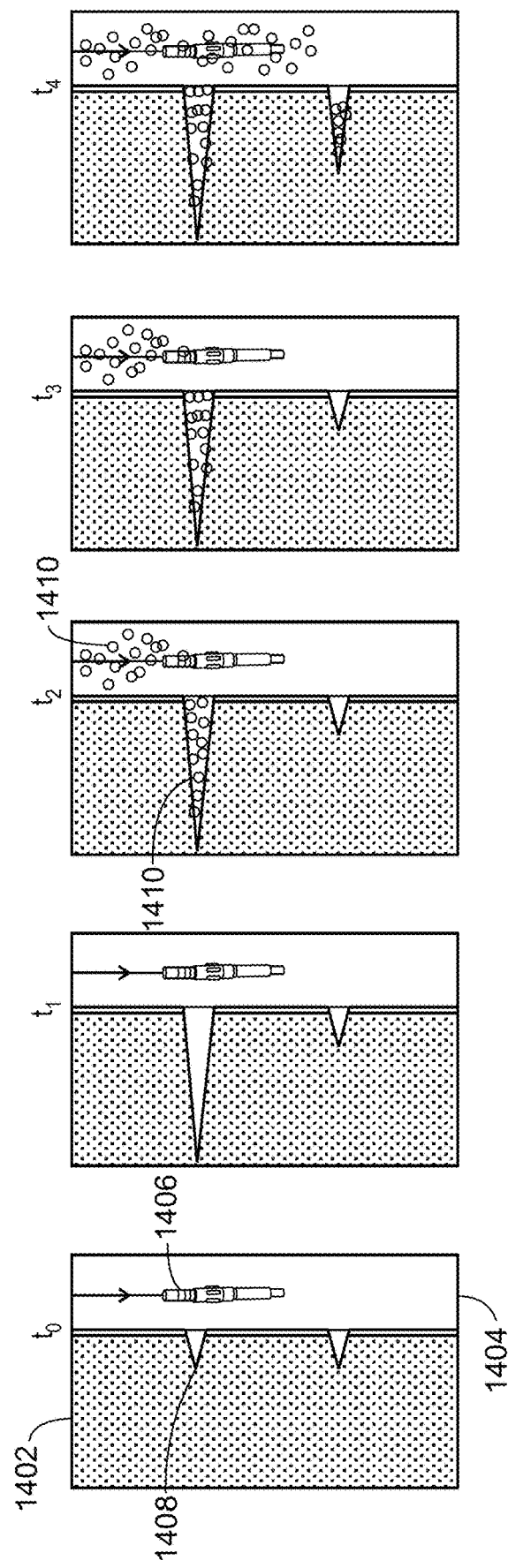
FIG. 14 is an illustration of a method of increasing the permeability of a subterranean zone.

FIG. 14 is an illustration of the method 1400 of increasing the permeability of a subterranean zone 1402. At time to, a magnetic field tool 1406 is placed in a wellbore 1404. At time $t_1$, a fracturing fluid is injected into the wellbore, and a fracture 1408 is initiated and propagated. At time $t_2$, a second fracturing fluid including a suspension of ferromagnetic materials 1410 is injected into the wellbore. At time $t_3$, the magnetic field tool is activated to generate a magnetic field, and a plug of 3D ferromagnetic proppant clogs the existing fracture. At time $t_4$, the plug diverts the flow to a new zone.

Figure 15:
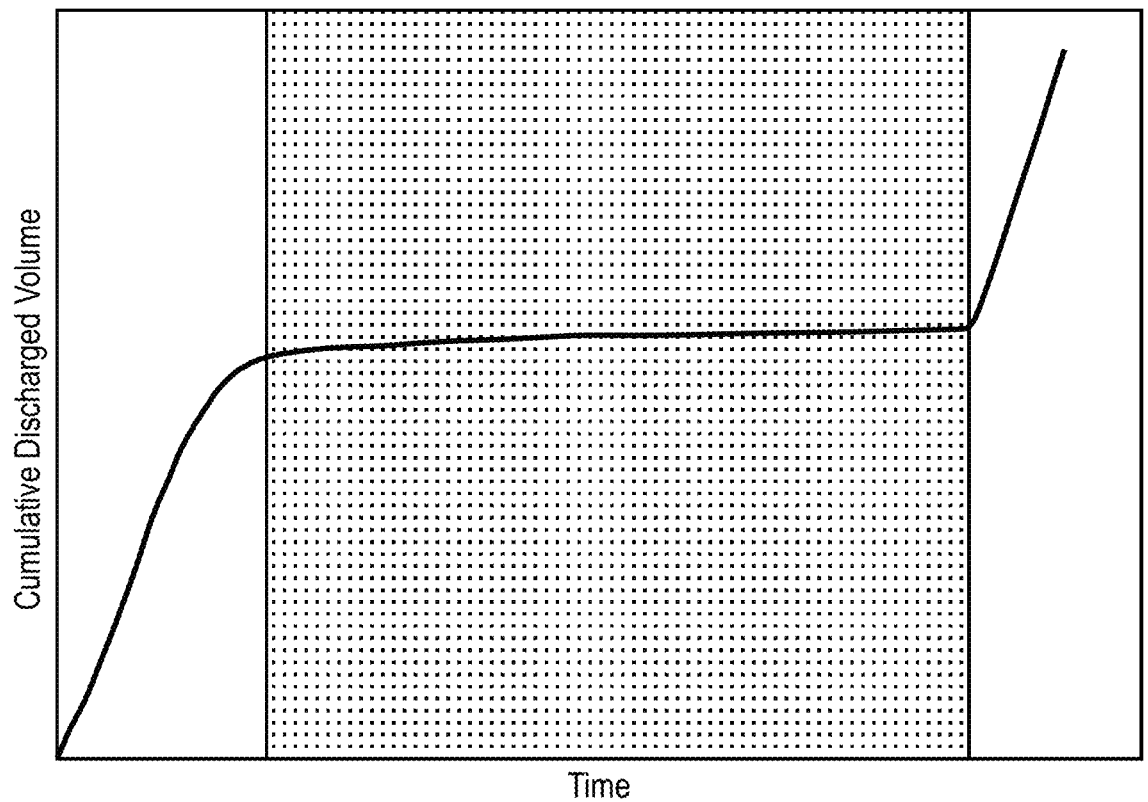
FIG. 15 shows the behavior of a discharge volume in a fracture as a function of time.

FIG. 15 shows the behavior of a discharge volume in a fracture as a function of time. The blank (i.e., untextured) regions represent the time at which a magnetic field is off. During this time, the fracture is conductive, and fluid can be injected. The dotted (i.e., textured) region represents the time wherein the magnetic field, i.e., the magnetic field generated by the magnetic field tool, is active. A low permeable plug forms as a result of the aggregation of the 3D cross particles, and the injectivity of the fracture ceases. This helps divert fluid flow to a new unstimulated region.

In some embodiments, the 3D cross particles, 3D ferromagnetic proppant, and/or coated 3D ferromagnetic proppant are used as a loss circulation material. Lost circulation is the loss of drilling fluids to the formation surrounding the wellbore. Lost drilling fluid enters the formation instead of returning up the annulus, resulting in increased costs and decreased productivity. The 3D cross particles, 3D ferromagnetic proppant, and/or coated 3D ferromagnetic proppant can be used as a loss circulation material to prevent the loss of drilling fluid. For example, the 3D cross particles, 3D ferromagnetic proppant, and/or coated 3D ferromagnetic proppant can be added to a drilling fluid and injected into a subterranean feature experiencing lost circulation. The 3D cross particles, 3D ferromagnetic proppant, and/or coated 3D ferromagnetic proppant can then enter the formation at the point where drilling fluid is being lost. In some embodiments, the cross particles naturally form cross-links. In some embodiments, a magnetic field tool or naturally occurring magnetic field induces the cross-linking of these particles. The crosslinked particles create a plug, preventing further loss of drilling fluid.

In some embodiments, the ferromagnetic particles and proppants described herein are used to enhance heavy oil recovery by generating electromagnetic heat. The ferromagnetic particles and/or proppants described herein can be placed in a wellbore and exposed to an alternating magnetic field. In response to the alternating field, the particles and/or proppants generate heat through hysteresis losses.

Figure 16:
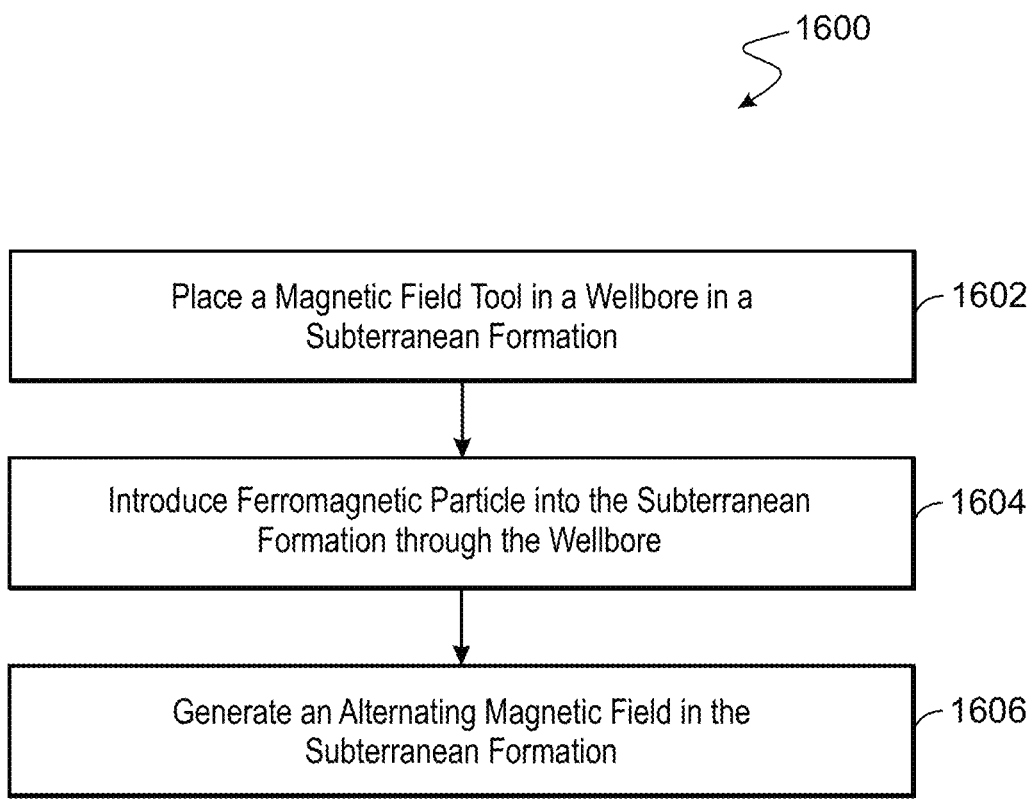
FIG. 16 is a flow chart of an example method of enhancing heavy oil recovery utilizing electromagnetic heat.

FIG. 16 is a flow chart of an example method 1600 of enhancing heavy oil recovery utilizing electromagnetic heat. At 1602, a magnetic field tool is placed in a well bore in a subterranean formation. At 1604, ferromagnetic particles are introduced into the subterranean formation through the wellbore. The ferromagnetic particles can be ferromagnetic proppant, coated ferromagnetic proppant, 3D ferromagnetic proppant, or coated 3D ferromagnetic proppant, as described herein, or any combination thereof. The ferromagnetic particles can be injected into the reservoir through a wellbore. At 1606, the magnetic field tool is used to generate an alternating magnetic field in the subterranean formation. The frequency and intensity of the field should be optimized to induce heating in the ferromagnetic particles. In some embodiments, the maximum strength of the magnetic field can vary from about 0.5 to about 1 Tesla. The alternating magnetic field induces the ferromagnetic particles to generate heat through hysteresis losses. This heat is transferred to the surrounding heavy oil, reducing its viscosity and improving its mobility. The heated oil can then flow more easily through the reservoir towards production wells. In some embodiments, the temperature, pressure, and production rates in the reservoir are continuously monitored to assess the effectiveness of the electromagnetic heating process. The electromagnetic field and/or the concentration of the ferromagnetic materials can be adjusted based on the observed parameters. The heated heavy oil can be extracted from the subterranean formation. The enhanced mobility of the heavy oil due to the electromagnetic heating process improves oil recovery rates.

Ferromagnetic materials are excellent electromagnetic wave absorbers and catalysts. In oil and water separation processes, ferromagnetic materials, for example ferromagnetic proppant or 3D ferromagnetic proppant as described herein, can be utilized for oil and water separation. Ferromagnetic proppant or 3D ferromagnetic proppant can be coated with superhydrophobic (lipophilic) polymers to generate an oil-adsorbing particle, i.e., a lipophilic ferromagnetic proppant or lipophilic 3D ferromagnetic proppant. The surface charge of these lipophilic ferromagnetic proppants is positive. In contrast, oil droplets have a negative surface charge. Accordingly, oil droplets are electrostatically attracted to the lipophilic ferromagnetic proppants.

The lipophilic ferromagnetic particles are synthesized by dissolving a lipophilic polymer in a solvent to create a polymer solution. In some implementation, the lipophilic polymer is poly(2-dimethylaminoethyl methacrylate), cellulose aerogels, poly(lactic-co-glycolic acid), or polyvinylpyrrolidone. The solvent depends on the properties of the lipophilic polymer. In some embodiments, the solvent is ethyl acetate, which can dissolve a wide range of lipophilic substances. The ferromagnetic proppant or 3D ferromagnetic proppant is combined with the polymer solution. This can be achieved, for example, by adding the polymer solution to a proppant suspension or by dispersing the nanoparticles in the polymer solution using a blender. The pH of the solution is adjusted to promote electrostatic attraction between the ferromagnetic proppant or 3D ferromagnetic proppant and the lipophilic polymers. In some embodiments, the pH is adjusted by the addition of a weak acid, for example, acetic acid. This results in a coating of lipophilic particles, generating lipophilic ferromagnetic particles or 3D lipophilic ferromagnetic particles.

Figure 17:
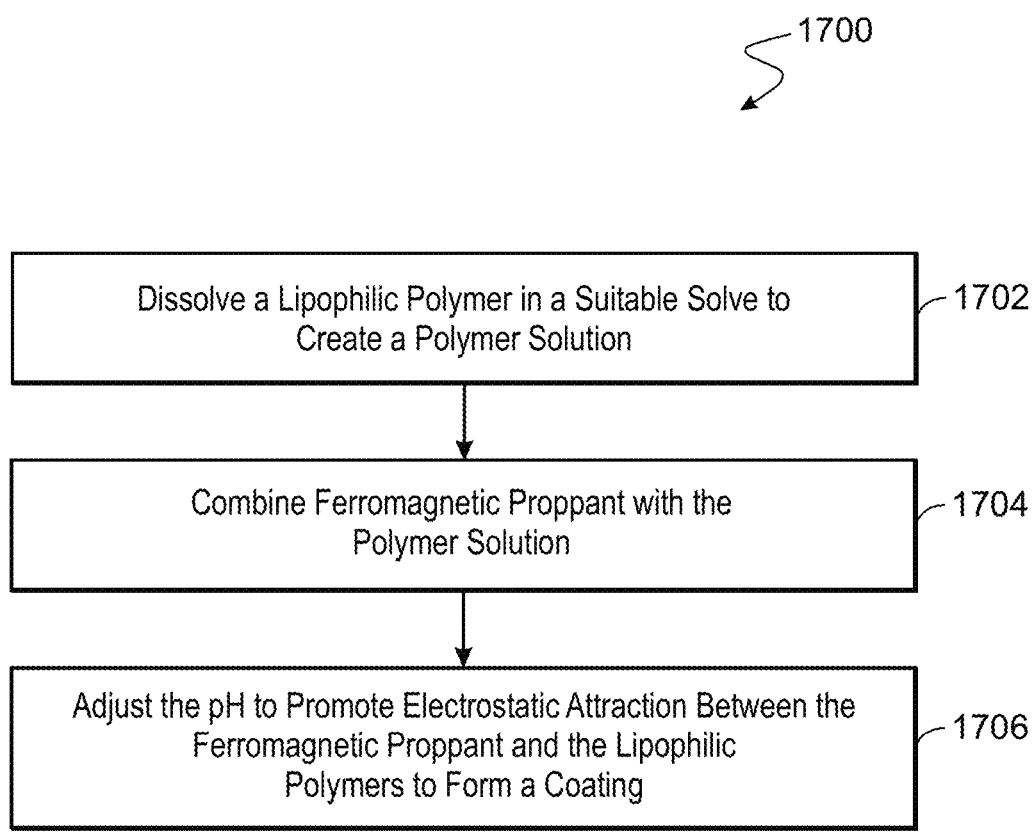
FIG. 17 is a flow chart of an example method of synthesizing lipophilic ferromagnetic proppants.

FIG. 17 is a flow chart of an example method 1700 of synthesizing lipophilic ferromagnetic proppants. At 1702, a lipophilic polymer is dissolved in a suitable solvent to create a polymer solution. In some embodiments, the solvent is ethyl acetate. At 1704, the ferromagnetic proppant or 3D ferromagnetic proppant is combined with the polymer solution. At 1706, the pH is adjusted to promote electrostatic attraction between the ferromagnetic proppant or 3D ferromagnetic proppant and the lipophilic polymers to form a coating and generate lipophilic ferromagnetic particles. In some embodiments, the pH is adjusted by the addition of a weak acid, for example, acetic acid.

In some embodiments, lipophilic ferromagnetic particles are used to separate water and oil. The lipophilic ferromagnetic particles and/or 3D lipophilic ferromagnetic particles are placed in an oil/water mixture or emulsion. The particles and the oil/water mixture are mixed. During mixing, oil droplets in the suspension adsorb to the lipophilic ferromagnetic particles or 3D lipophilic ferromagnetic particles. Next, an electromagnetic field is applied to the suspension. The electromagnetic field is used to separate the particles from the suspension. Accordingly, the oil droplets adsorbed to the lipophilic ferromagnetic particles or 3D lipophilic particles will also be separated from the suspension. In some embodiments, the adsorbed oil is washed away from the lipophilic ferromagnetic particles or 3D lipophilic ferromagnetic particles with a solvent, for example, ethanol. After washing away the adsorbed oil, the lipophilic ferromagnetic particles can be reused.

Figure 18:
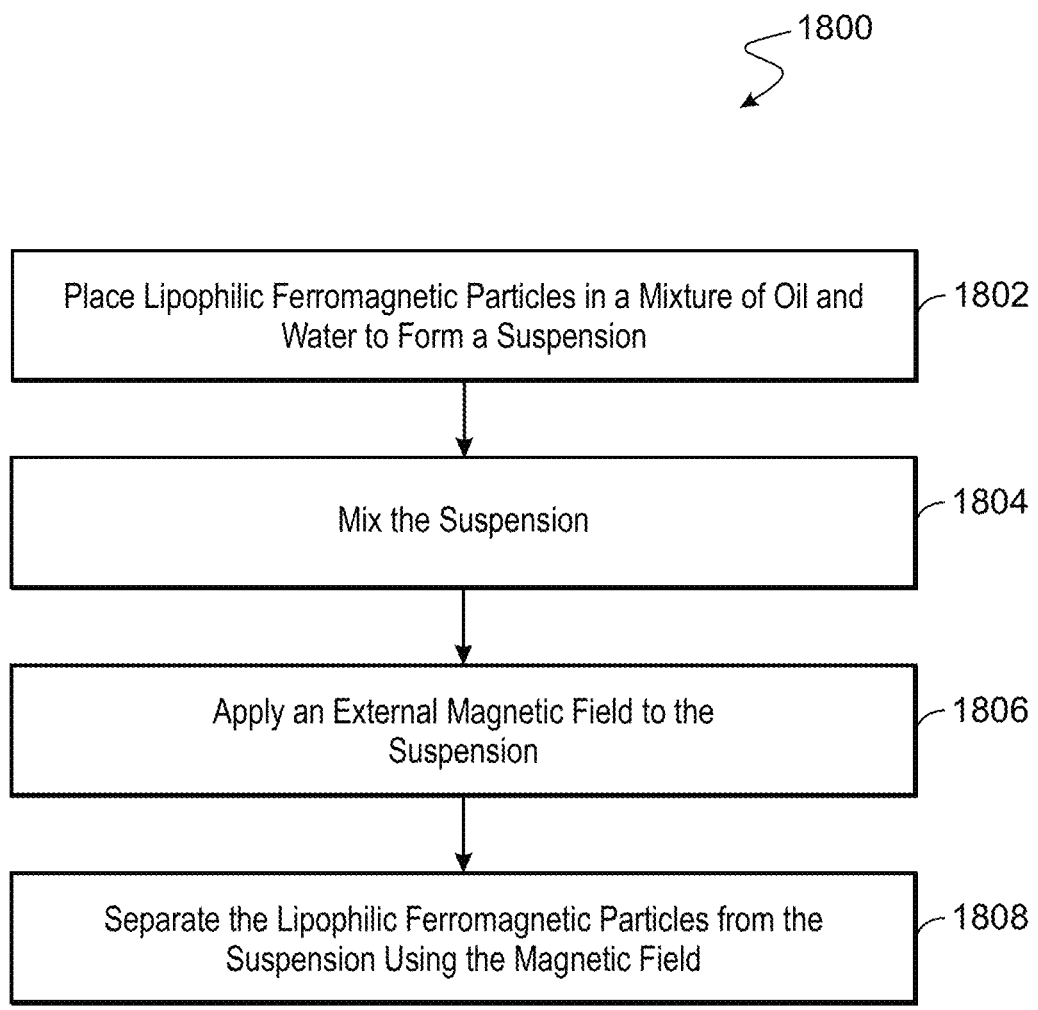
FIG. 18 is a flow chart of an example method of separating oil and water.

FIG. 18 is a flow chart of an example method 1800 of separating oil at water. At 1802, lipophilic ferromagnetic particles or 3D lipophilic ferromagnetic particles are placed in an oil/water mixture to form a suspension. At 1804, the suspension is mixed, for example by stirring. During mixing, oil droplets in the suspension adsorb to the lipophilic ferromagnetic particles or 3D lipophilic ferromagnetic particles. At 1806, an external magnetic field is applied to the suspension. At 1808, the lipophilic ferromagnetic particles or 3D lipophilic ferromagnetic particles and the adsorbed oil are separated from the suspension using the magnetic field. Optionally, the adsorbed oil is washed away from the lipophilic ferromagnetic particles or 3D lipophilic ferromagnetic particles with a solvent, for example, ethanol.

Definitions

Unless otherwise defined, all technical and scientific terms used in this document have the same meaning as commonly understood by one of ordinary skill in the art to which the present application belongs. Methods and materials are described in this document for use in the present application; other, suitable methods and materials known in the art can also be used. The materials, methods, and examples are illustrative only and not intended to be limiting. All publications, patent applications, patents, sequences, database entries, and other references mentioned in this document are incorporated by reference in their entirety. In case of conflict, the present specification, including definitions, will control.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (for example, 1%, 2%, 3%, and 4%) and the sub-ranges (for example, 0.1% to 0.5%, 1.1% to 2.2%, and 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

The term "about," as used in this disclosure, can allow for a degree of variability in a value or range, for example, within 10%, within 5%, or within 1% of a stated value or of a stated limit of a range.

As used in this disclosure, the terms "a," "an," and "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

In the methods described in this disclosure, the acts can be carried out in any order, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "substantially" as used in this disclosure refers to a majority of, or mostly, as in at least about 50%, 60%, 70%, 80%, 90%, 95%, 96%, 97%, 98%, 99%, 99.5%, 99.9%, 99.99%, or at least about 99.999% or more.

The term "solvent" as used in this disclosure refers to a liquid that can dissolve a solid, another liquid, or a gas to form a solution. Non-limiting examples of solvents are silicones, organic compounds, water, alcohols, ionic liquids, and supercritical fluids.

The term "room temperature" as used in this disclosure refers to a temperature of about 15 degrees Celsius (° C.) to about 28° C.

The term "downhole" as used in this disclosure refers to under the surface of the earth, such as a location within or fluidly connected to a wellbore.

As used in this disclosure, the term "drilling fluid" refers to fluids, slurries, or muds used in drilling operations downhole, such as during the formation of the wellbore.

As used in this disclosure, the term "stimulation fluid" refers to fluids or slurries used downhole during stimulation activities of the well that can increase the production of a well, including perforation activities. In some examples, a stimulation fluid can include a fracturing fluid or an acidizing fluid.

As used in this disclosure, the term "fracturing fluid" refers to fluids or slurries used downhole during fracturing operations.

As used in this disclosure, the term "fluid" refers to liquids and gels, unless otherwise indicated.

As used in this disclosure, the term "subterranean material" or "subterranean zone" refers to any material under the surface of the earth, including under the surface of the bottom of the ocean. For example, a subterranean zone or material can be any section of a wellbore and any section of a subterranean petroleum- or water-producing formation or region in fluid contact with the wellbore. Placing a material in a subterranean zone can include contacting the material with any section of a wellbore or with any subterranean region in fluid contact the material. Subterranean materials can include any materials placed into the wellbore such as cement, drill shafts, liners, tubing, casing, or screens; placing a material in a subterranean zone can include contacting with such subterranean materials. In some examples, a subterranean zone or material can be any downhole region that can produce liquid or gaseous petroleum materials, water, or any downhole section in fluid contact with liquid or gaseous petroleum materials, or water. For example, a subterranean zone or material can be at least one of an area desired to be fractured, a fracture or an area surrounding a fracture, and a flow pathway or an area surrounding a flow pathway, in which a fracture or a flow pathway can be optionally fluidly connected to a subterranean petroleum- or water-producing region, directly or through one or more fractures or flow pathways.

As used in this disclosure, "treatment of a subterranean zone" can include any activity directed to extraction of water or petroleum materials from a subterranean petroleum- or water-producing formation or region, for example, including drilling, stimulation, hydraulic fracturing, clean-up, acidizing, completion, cementing, remedial treatment, abandonment, aquifer remediation, identifying oil rich regions via imaging techniques, and the like.

As used in this disclosure, a "flow pathway" downhole can include any suitable subterranean flow pathway through which two subterranean locations are in fluid connection. The flow pathway can be sufficient for petroleum or water to flow from one subterranean location to the wellbore or vice-versa. A flow pathway can include at least one of a hydraulic fracture, and a fluid connection across a screen, across gravel pack, across proppant, including across resin-bonded proppant or proppant deposited in a fracture, and across sand. A flow pathway can include a natural subterranean passageway through which fluids can flow. In some embodiments, a flow pathway can be a water source and can include water. In some embodiments, a flow pathway can be a petroleum source and can include petroleum. In some embodiments, a flow pathway can be sufficient to divert water, a downhole fluid, or a produced hydrocarbon from a wellbore, fracture, or flow pathway connected to the pathway.

As used in this disclosure, "weight percent" (wt %) can be considered a mass fraction or a mass ratio of a substance to the total mixture or composition. Weight percent can be a weight-to-weight ratio or mass-to-mass ratio, unless indicated otherwise.

A number of implementations of the disclosure have been described. Nevertheless, it will be understood that various modifications may be made without departing from the spirit and scope of the disclosure.

Embodiments

1. A ferromagnetic proppant for use in subterranean formations, the proppant comprising:
a core, wherein the core comprises a 3D cross particle, wherein the 3D cross particle comprises six arms protruding from a center point, each arm at a 90-degree angle to each of the four adjacent arms; and
a first coating, wherein the first coating comprises a ferromagnetic material.
2. The proppant of embodiment 1, wherein the 3D cross particle comprises acrylonitrile butadiene styrene.
3. The proppant of embodiment 1 or 2, wherein the 3D cross particle is between 0.1 to 0.8 cm in length and/or width.
4. The proppant of any one of embodiments 1-3, wherein each of the six arms of the 3D cross particle are substantially the same length.
5. The proppant of any one of embodiments 1-4, wherein each of the six arms of the 3D cross particle are substantially rectangular in shape.
6. The proppant of any one of embodiments 1-4, wherein each of the six arms of the 3D cross particle are substantially cylindrical in shape.
7. The proppant of any one of embodiments 1-6, wherein the ferromagnetic coating comprises iron oxide.
8. The proppant of any one of embodiments 1-7, wherein the iron oxide comprises $\varphi\text{-Fe}_2O_3$, $K\text{—Fe}_2O_3$, or $Fe_3O_4$.
9. The proppant of any one of embodiments 1-8, wherein the proppant comprises a second coating, wherein the second coating comprises $TiO_2$.
10. A method of increasing the permeability of a subterranean zone, the method comprising:
placing a magnetic field tool in a wellbore;
injecting a first fracturing fluid into the wellbore at a pressure higher than the closure stress of a formation surrounding the wellbore;
initiating and propagating a fracture;
injecting a second fracturing fluid including a suspension of ferromagnetic proppant into the wellbore, wherein the ferromagnetic proppant comprises
a core, wherein the core comprises a 3D cross particle, wherein the 3D cross particle comprises six arms protruding from a center point, each arm at a 90-degree angle to each of the four adjacent arms, and
a first coating, wherein the first coating comprises a ferromagnetic material; activating the magnetic field tool to generate a magnetic field;
plugging an existing fracture using the ferromagnetic proppant; and
diverting the first and/or second fracturing fluid to a new zone.
11. The method of embodiment 10, wherein the 3D cross particle comprises a second coating, wherein the second coating comprises $TiO_2$.
12. The method of embodiment 10 or 11, wherein the second fracturing fluid comprises from about 0.5 pounds per gallon to about 6 pounds per gallon of ferromagnetic proppant.
13. The method of any one of embodiments 10-12, wherein the magnetic field is from about 0.5 to about 1 T in strength.
14. The method of any one of embodiments 10-13, the method further comprising deactivating the magnetic field tool.
15. The method of any one of embodiments 10-14, the method further comprising monitoring the pressure and/or circulation of fluids in the wellbore, and optionally adjusting the concentration of the ferromagnetic proppant in the second fracturing fluid based on the pressure and/or circulation of fluids.
16. A method of enhancing heavy oil recovery, the method comprising:
placing a magnetic field tool in a wellbore in a subterranean formation;
introducing ferromagnetic particles into the subterranean formation through the wellbore; and
generating an alternating magnetic field in the subterranean formation using the magnetic field tool.
17. The method of embodiment 16, wherein the ferromagnetic particles comprise:
a core, wherein the core comprises a 3D cross particle, wherein the 3D cross particle comprises six arms protruding from a center point, each arm at a 90-degree angle to each of the four adjacent arms, and
a first coating, wherein the first coating comprises a ferromagnetic material.
18. The method of embodiment 16 or 17, wherein the ferromagnetic particles comprise a second coating, wherein the second coating comprises $TiO_2$.
19. The method of any one of embodiments 16-18, wherein generating an alternating magnetic field in the subterranean formation comprises a generating an alternating magnetic field with a maximum strength of about 0.5 to about 1 Tesla.
20. The method of any one of embodiments 16-19, the method further comprising extracting heavy oil from the subterranean formation.

What is claimed is:
1. A ferromagnetic proppant for use in subterranean formations, the proppant comprising:
a core, wherein the core comprises a 3D cross particle, wherein the 3D cross particle comprises six arms protruding from a center point, each arm at a 90-degree angle to each of the four adjacent arms, wherein each of the six arms of the 3D cross particle are substantially rectangular in shape; and a first coating, wherein the first coating comprises a ferromagnetic material.

2. The proppant of claim 1, wherein the 3D cross particle comprises acrylonitrile butadiene styrene.

3. The proppant of claim 1, wherein the 3D cross particle is between 0.1 to 0.8 cm in length and/or width.

4. The proppant of claim 1, wherein each of the six arms of the 3D cross particle are substantially the same length.

5. The proppant of claim 1, wherein the ferromagnetic coating comprises iron oxide.

6. The proppant of claim 5, wherein the iron oxide comprises $\varphi\text{-}Fe_2O_3$, $\gamma\text{-}Fe_2O_3$, or $Fe_3O_4$.

7. The proppant of claim 1, wherein the proppant comprises a second coating, wherein the second coating comprises $TiO_2$.

8. A method of increasing the permeability of a subterranean zone, the method comprising:

placing a magnetic field tool in a wellbore;

injecting a first fracturing fluid into the wellbore at a pressure higher than the closure stress of a formation surrounding the wellbore;

initiating and propagating a fracture;

injecting a second fracturing fluid including a suspension of ferromagnetic proppant into the wellbore, wherein the ferromagnetic proppant comprises a core, wherein the core comprises a 3D cross particle, wherein the 3D cross particle comprises six arms protruding from a center point, each arm at a 90-degree angle to each of the four adjacent arms, wherein each of the six arms of the 3D cross particle are substantially rectangular in shape, and a first coating, wherein the first coating comprises a ferromagnetic material;

activating the magnetic field tool to generate a magnetic field;

plugging an existing fracture using the ferromagnetic proppant; and diverting the first and/or second fracturing fluid to a new zone.

9. The method of claim 8, wherein the 3D cross particle comprises a second coating, wherein the second coating comprises $TiO_2$.

10. The method of claim 8, wherein the second fracturing fluid comprises from about 0.5 pounds per gallon to about 6 pounds per gallon of ferromagnetic proppant.

11. The method of claim 8, wherein the magnetic field is from about 0.5 to about 1 T in strength.

12. The method of claim 8, the method further comprising deactivating the magnetic field tool.

13. The method of claim 8, the method further comprising monitoring the pressure and/or circulation of fluids in the wellbore, and optionally adjusting the concentration of the ferromagnetic proppant in the second fracturing fluid based on the pressure and/or circulation of fluids.

14. A method of enhancing heavy oil recovery, the method comprising:

placing a magnetic field tool in a wellbore in a subterranean formation;

introducing ferromagnetic particles into the subterranean formation through the wellbore, wherein the ferromagnetic particles comprise a core, wherein the core comprises a 3D cross particle, wherein the 3D cross particle comprises six arms protruding from a center point, each arm at a 90-degree angle to each of the four adjacent arms, wherein each of the six arms of the 3D cross particle are substantially rectangular in shape, and a first coating, wherein the first coating comprises a ferromagnetic material; and generating an alternating magnetic field in the subterranean formation using the magnetic field tool.

15. The method of claim 14, wherein the ferromagnetic particles comprise a second coating, wherein the second coating comprises $TiO_2$.

16. The method of claim 14, wherein generating an alternating magnetic field in the subterranean formation comprises a generating an alternating magnetic field with a maximum strength of about 0.5 to about 1 Tesla.

17. The method of claim 14, the method further comprising extracting heavy oil from the subterranean formation.

* * * * *